(No Model.) 2 Sheets—Sheet 1.

J. W. & J. R. HOUCHIN.
CONTINUOUS GLASS MELTING FURNACE.

No. 254,654. Patented Mar. 7, 1882.

Witnesses:

Inventors:
Joshua W. Houchin
Joshua R. Houchin
By A. W. Almqvist
Attorney (No Model.) 2 Sheets—Sheet 2.
J. W. & J. R. HOUCHIN.
CONTINUOUS GLASS MELTING FURNACE.
No. 254,654. Patented Mar. 7, 1882.
*Fig: 3.*
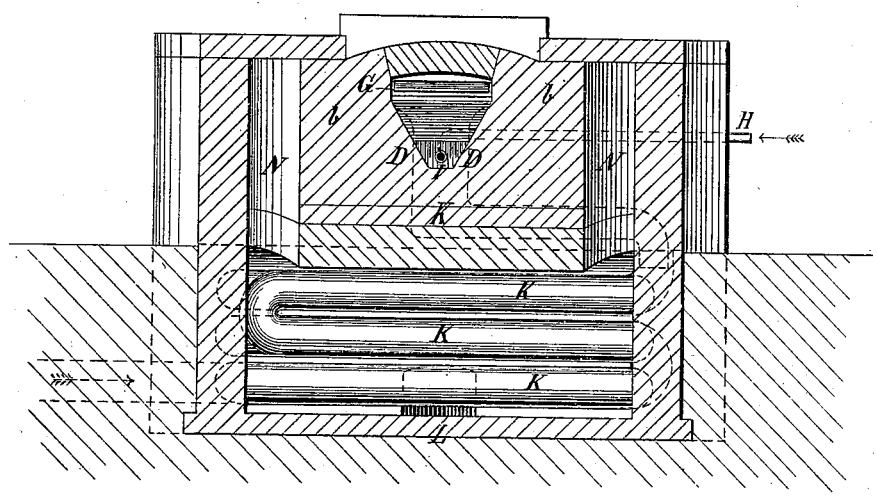
*Fig: 4.*
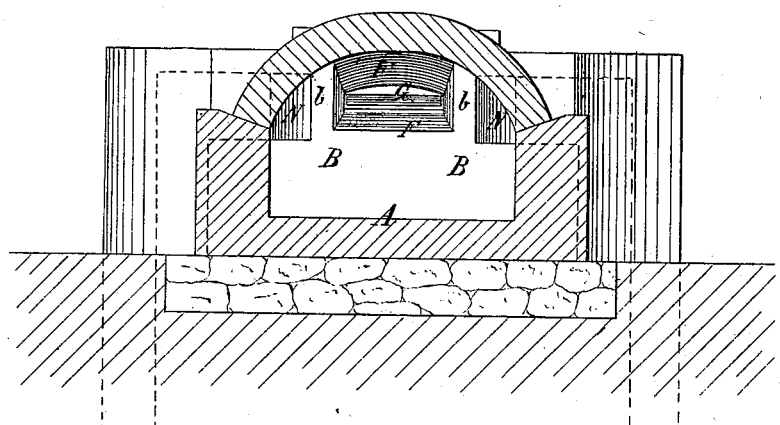
Witnesses:
S. P. Sumnergren
John M. Stelle
Inventors:
Joshua W. Houchin
Joshua R. Houchin
By A. W. Almqvist
Attorney.

UNITED STATES PATENT OFFICE.

JOSHUA W. HOUCHIN AND JOSHUA R. HOUCHIN, OF BROOKLYN, NEW YORK.

CONTINUOUS GLASS-MELTING FURNACE.

SPECIFICATION forming part of Letters Patent No. 254,654, dated March 7, 1882.

Application filed July 20, 1881. (No model.)

*To all whom it may concern:*

Be it known that we, JOSHUA W. HOUCHIN and JOSHUA R. HOUCHIN, of Brooklyn, in the county of Kings and State of New York, have invented a new and useful Improvement in Continuous Glass-Melting Furnaces, of which the following is a specification.

Our present invention relates to glass-furnaces of that class in which the crushed or pulverized material to be converted into glass is melted, not in separate melting-pots, but in one main furnace or melting-trough, and thence flows through channels in a partition bridge-wall into an auxiliary furnace or reservoir the floor of which is a little below the level of that of the main furnace. The walls of the auxiliary furnace are provided with the working-openings through which the melted glass is accessible by the workmen.

Our present object is to provide an improved construction of similar furnaces to adapt them for burning petroleum or other liquid hydrocarbon, and to improve combustion and intensify the heat by the use of a combination of a hydrocarbon-nozzle and an auxiliary superjacent and adjustable air-blast, as in the furnace heretofore invented by us for puddling and smelting of iron.

Figure 1:
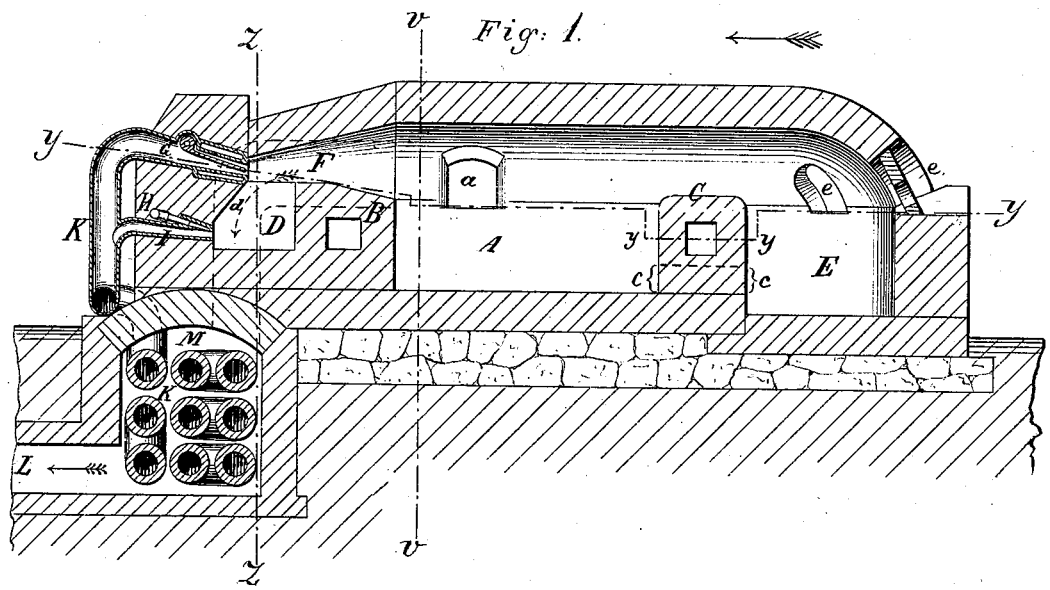
Figure 2:
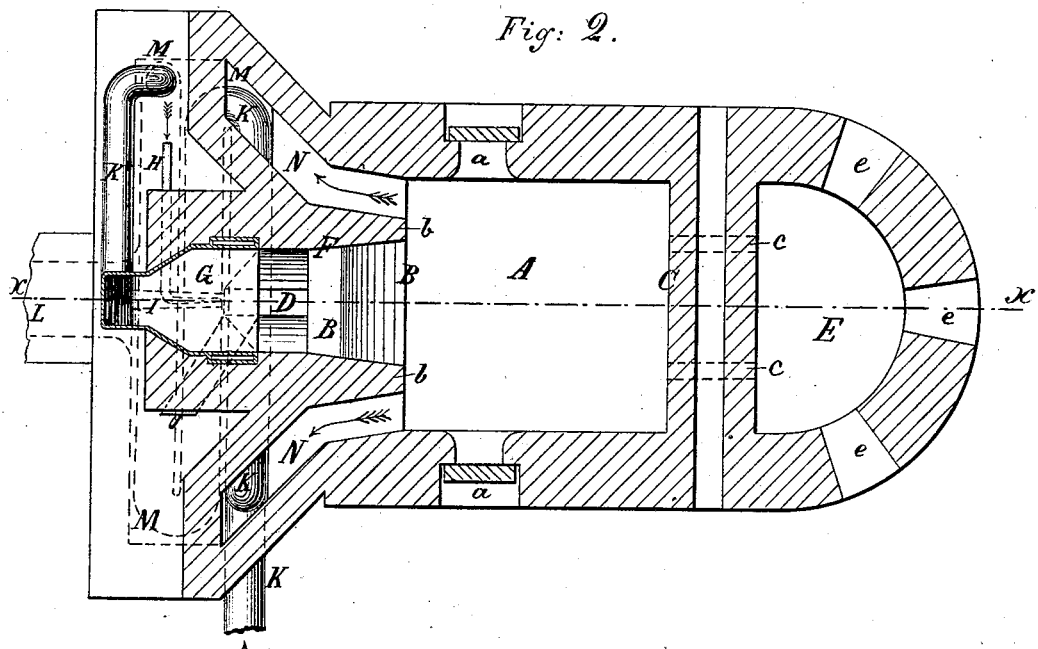

In the accompanying two sheets of drawings, Figure 1 represents a longitudinal vertical section of our improved continuous glass-furnace, the section being taken on the line $xx$ of Fig. 2. Fig. 2 is a horizontal section of the same, taken on the line $yy$ of Fig. 1. Fig. 3 is a vertical cross-section of the same, taken on the line $zz$ of Fig. 1, and seen in direction of the arrow. Fig. 4 is a vertical cross-section of the same, taken on the line $vv$ of Fig. 1, and seen in direction of the arrow.

Like letters of reference indicate like parts in the several figures.

A designates the furnace proper or melting-trough, into which the crushed or pulverized material is introduced by means of the side openings, $a$. Two fire bridge-walls, B and C, constitute the front and rear walls, respectively, of the furnace A, the former bridge separating it from the kindling-box D, and the latter bridge separating it from the auxiliary or receiving furnace or trough E.

Through the wall C, and flush with the floor of the furnace A, are two or more small channels, $c$, through which the melted material, in a properly liquid state, flows into the auxiliary furnace or working-trough E, whose bottom or floor is below the level of that of the main furnace A, the melted glass being accessible by means of the hand-gates and working-openings $e$.

The kindling-box is nearly triangular in cross-section, having a narrow bottom and upward-flaring sides, as shown in Fig. 3, which run into the side walls of the fire, entering flue F above it, the front end of which latter flue is occupied to its full width by the adjustable air-blast nozzle G. Lengthwise the kindling-box D is wider at the bottom than at the top, the front end wall, $d$, receding, as shown in Fig. 1, from the lower edge of the blast-nozzle G to near the bottom of the box D, where the liquid-hydrocarbon pipe H and its subjoining atomizing air-pipe I enter.

The nozzle G and atomizer H I are connected to the same air-supply pipe K and otherwise constructed and arranged, as described in our previous invention patented July 12, 1881.

The length of the kindling-box being greater at the bottom than at the top, and its width being greater at the top than at the bottom, and the superjacent nozzle G projecting considerably beyond the atomizer H I, the ignited vapors will be caused to gradually spread as they ascend to the full width of the intercepting air-jet from the nozzle G and become effectually oxygenated by the said jet, and further spread through the inward-widening flue F, and again when entering the furnace proper A. As shown in Fig. 1, the nozzles enter through the front end, and, together with the kindling-box D and flue F, are located in the longitudinal vertical center plane of the furnace.

The unconsumed and heated gases resultant on combustion and partial expulsion of matter from the melting material pass off into and through the return-flues N, which are arranged through the upper part of the bridge-wall B, one on each side of the entering-flue F, from which they are separated by walls $b$, reaching to the roof of the furnace, as clearly shown in Figs. 2, 3, and 4. The lateral directions of these flues N diverge rapidly from the center plane of the furnace, but continue about horizontal until they reach to above the ends of the blast heating chamber M, when they turn abruptly downward to the said chamber, as shown in Figs. 2 and 3, and in dotted lines in Figs. 1 and 4. The aforesaid heated air and gases, following the course of the flues N to the said chamber M, impart heat to the blast-pipe K and the entering air and, then pass off through the flue L to the chimney. The chamber M is oblong or narrow in proportion to its length, and is arranged with its length transversely to that of the furnace, underneath the front end of the latter, as shown in the drawings, and the blast-supply-pipe K (in which the air from a blowing-machine enters at arrow 1, Fig. 2) forms a series of coils and return-bends, so as to acquire a large heating-surface before rising to the nozzles I and G. By the said arrangement of the heating-chamber M the heating escape-gases are caused to travel a considerable distance, and thus to give off a large portion of their heat to the blast without increasing the distance of travel of the entering blast before it reaches the melting-trough A.

Having thus described our invention, what we claim as new, and desire to secure by Letters Patent, is—

1. In a glass-furnace for burning liquid hydrocarbon, the kindling-box provided with upward-flaring side walls, diverging from a narrow bottom to about the width of the blast-nozzle G and flue F, and having overhanging front wall, $d$, causing upward-diminishing length, in combination with the atomizer H I and superjacent blast-nozzle G, arranged substantially as shown and described.

2. In a continuous glass-furnace having atomizer H I and superjacent blast-nozzle G, the combination of the central entering-flue, F, melting-trough A, and lateral return-flues N, with the blast heating chamber M, placed across and underneath the front end of the furnace, substantially as specified.

JOSHUA W. HOUCHIN.
JOSHUA R. HOUCHIN.

Witnesses:
 C. SEDGWICK,
 JOHN M. STELLE.